(12) United States Patent
Gerardin et al.

(10) Patent No.: US 6,222,822 B1
(45) Date of Patent: *Apr. 24, 2001

(54) METHOD FOR OPTIMIZING A DIGITAL TRANSMISSION NETWORK OPERATION THROUGH TRANSIENT ERROR MONITORING AND CONTROL AND SYSTEM FOR IMPLEMENTING SAID METHOD

(75) Inventors: Pierre Gerardin; Patrick Massi, both of Saint Laurent-du-Var; Victor Spagnol, Cagnes sur Mer, all of (FR)

(73) Assignee: Cisco Systems, Incorporated, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,273

(22) Filed: Mar. 31, 1997

(30) Foreign Application Priority Data

Apr. 23, 1996 (EP) .................................................. 96480052

(51) Int. Cl.[7] .............................. G01R 31/08; H04L 12/56
(52) U.S. Cl. ........................ 370/230; 370/412; 370/252
(58) Field of Search .................................... 370/230, 229, 370/235, 252, 412, 413, 414, 415, 416, 417, 418, 419, 421, 428, 216, 217, 218, 242, 244, 250, 253, 463, 465; 395/265, 262, 200.55; 709/232, 235, 225

(56) References Cited

U.S. PATENT DOCUMENTS

| | | | | |
|---|---|---|---|---|
| 5,335,224 | * | 8/1994 | Cole et al. | 370/235 |
| 5,367,643 | * | 11/1994 | Chang et al. | 710/129 |
| 5,493,566 | * | 2/1996 | Ljungberg et al. | 370/412 |
| 5,541,912 | * | 7/1996 | Choudhury et al. | 370/412 |
| 5,602,841 | * | 2/1997 | Lebizay et al. | 370/413 |
| 5,812,527 | * | 9/1998 | Kline et al. | 370/232 |

\* cited by examiner

Primary Examiner—Wellington Chin
Assistant Examiner—Steven Nguyen
(74) Attorney, Agent, or Firm—Cesari & McKenna

(57) ABSTRACT

Method and system for tracking transient errors and controlling data traffic in a high speed packet switching network node. The traffic exits each node through a transmit queue per connection between end users.

The queue is monitored at both queue level through a threshold based mechanism (53) and a control of time activity mechanism (55). If trouble is detected by any one of these mechanisms, the queue packet admission is momentarily barred. To that end, a Line Resources Manager (LRM) provides queue threshold and time-out references and keeps monitoring the node global buffering memory available. If required, the LRM may also report to Network Management facilities for possible rerouting of the traffic.

6 Claims, 8 Drawing Sheets

METHOD FOR OPTIMIZING A DIGITAL TRANSMISSION NETWORK OPERATION THROUGH TRANSIENT ERROR MONITORING AND CONTROL AND SYSTEM FOR IMPLEMENTING SAID METHOD

FIELD OF THE INVENTION

The present invention deals with a method and system for optimizing a digital transmission network operation by tracking transient errors and monitoring and controlling data traffic accordingly, in a network node. More particularly, the invention relates to high speed packet switching transmission networks.

BACKGROUND OF THE INVENTION

The evolution of the telecommunications in general and of the packet switching networks in particular is driven by many factors among which two are worth emphasizing: technologies and applications.

Communication technologies have realized these last years considerable progress with:

the maturing of new transmission media and specially of optical fiber. High speed rates can now be sustained with very low bit error rates. For example, the very important bandwidth provided by optical connections, their low attenuation and their high transmission quality are turned into profit for long distance networks as well as for high rate local networks.

the universal use of digital technologies within private and public telecommunications networks.

The emergence of high speed transmission entails an explosion in the high bandwidth connectivity. The advent of these new technologies has pushed the speed of communication links to the area of the giga-bit per second representing an increase of several orders of magnitude over typical links in traditional networks. The increase of the communication capacity is generating more attractive tariffs and large bandwidths are economically more and more attractive.

On the other hand, in relation with these new emerging technologies, many potential applications that were not possible before are now becoming accessible and attractive. In this environment, three generic requirements are expressed by the users:

Improving old applications. Sub-second response times, which are achievable on low cost personal computers, have raised user expectations so that the lengthy wide area networks response times that were acceptable some years ago are today no longer tolerable. The user interface can be bettered, for example, with fast response full screen applications.

Optimizing communication networks. There is a need for rationalizing the many disparate networks that major users have. Investments can be optimized by integrating heterogeneous traffics like voice, video, and data over the same transport facilities regardless of protocols. Users want the opportunity to control their networking cost by choosing among the different price/performance options offered by the variety of vendors and carriers and to maximize their ability to take advantage of applications built on top of disparate underlying network technologies. However, the motivation for rationalization is not only to save money on links but also to provide a better networking service by integrating the many disparate networks into a single coherently managed unit.

Doing new applications. Emerging applications like graphic, image, video, and multimedia processing are requiring a very large volume of traffic. These new applications that were not feasible (or even thinkable) before are now accessible and generating an ever-increasing demand on bandwidth.

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic, and requires more connectivity.

Based on the above, there is strong requirement for supporting distributed computing applications across high speed networks that can carry local area network communications, voice, video, and traffic among channel attached hosts, business engineering workstations, terminals, and small to intermediate file servers.

This vision of a high speed multiprotocol network is the driver for the emergence of fast packet switching networks architectures in which data, voice, and video information is digitally encoded, chopped into small packets and transmitted through a common set of nodes and links. This high speed packet switching network includes nodes interconnecting high speed links (lines or trunks) for orienting the traffics of a great number of users toward preassigned paths each establishing a connection between two end users. Given the high bandwidth over said links, hundreds of connections are supported by each link, and thus handled in each network node. One may therefore easily imagine how catastrophic the consequences of any transmission error that would jam the network, and possibly put the whole system down, would be. This certainly does emphasize the importance of early detecting these errors, particularly when they are of a transient nature, and reorganizing the network traffic accordingly. The present invention shall focus on that.

An efficient transport of mixed traffic streams on very high speed line means for these new network architectures, a set of requirements in terms of performance and resource consumption which can be summarized as follows:

a very large flexibility to support a wide range of connectivity options, a very high throughput and a very short packet processing time, an efficient flow and congestion control.

In high speed networks, the nodes must provide a total connectivity. This includes attachment of the user's devices, regardless of vendor or protocol, and the ability to have the end user communicate with any other device. The network must support any type of traffic including data, voice, video, fax, graphic or image. The nodes must be able to take advantage of all common carrier facilities and to be adaptable to a plurality of protocols. All needed conversions must be automatic and transparent to the end user.

One of the key requirements of high speed packet switching networks is to reduce the end-to-end delay in order to satisfy real time delivery constraints and to achieve the necessary highnodal throughput for the transport of voice and video.

Increases in link speeds have not been matched by proportionate increases in the processing speeds of communication nodes and the fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis. The flow control and particularly the path selection and bandwidth management processes are managed by the access points of the network which reduces both the awareness and the function of the intermediate nodes.

Communication networks have at their disposal limited resources to ensure an efficient packets transmission. An efficient bandwidth management is essential to take full advantage of a high speed network. While transmission costs per byte continue to drop year after year, transmission costs are likely to continue to represent the major expense of operating future telecommunication networks as the demand for bandwidth increases.

Thus considerable efforts have been spent on designing flow and congestion control processes, bandwidth reservation mechanisms, routing algorithms to manage the network bandwidth.

An ideal network should be able to transmit a useful traffic directly proportional to the traffic offered to the network and this as far as the maximum transmission capacity is reached. Beyond this limit, the network should operate at its maximum capacity whatever the demand is. In the reality, the operations diverge from the ideal for a certain number of reasons which are all related to the inefficient allocation of ressources in overloaded environment.

For the operating to be satisfactory, the network must be implemented so as to avoid congestion.

The simplest solution obviously consists in oversizing the equipments so as to be positioned in an operating zone which is distant from the congestion. This solution is generally not adopted for evident reasons of costs and it is necessary to apply a certain number of preventive measures among which the main ones are:
 the flow control for regulating the emitting data rate of the calling subscriber at a rate compatible with what the receiver can absorb.
 the load regulation for globally limiting the number of packets present in the network to avoid an overloading of the resources, and
 the load balancing for fairly distributing the traffic over all the links of the network to avoid a local congestion in particular resources.

The flow and congestion control operations in the network generate additional traffic on the network. Ideally only the exact bandwidth needed at any time by a network connection should be dynamically reserved for that connection, and also only the exact bandwidth needed for the network control operations should be reserved for that purpose.

However, it is essential for an efficient flow and congestion control to provide at any time enough network resources in terms of bandwidth or performance to the control traffic. The control traffic can be divided into two main families including a network routing control traffic, and a network signalling control traffic.

The routing control traffic is used for distributing the network topology information between nodes of the network. This information is necessary mainly for the computation of routing paths between nodes in the network. Routing control messages are generally broadcasted to all nodes by means of Spanning Tree or flooding mechanisms. Insufficient resources for routing control messages could lead to invalid network topology tables. It is obvious that a node, with an erroneous or obsolete view of the network topology, may take wrong routing decisions.

The signalling control traffic is used to establish point-to-point and point-to-multipoint network connections across the network. Signalling control messages are generally forwarded towards the different nodes along the path of the connections. Insufficient resources for signalling control messages could typically lead to errors or at least to a degradation of the quality of service in the establishment and management of network connections.

Because of the high importance of the network control traffic, enough bandwidth on the links must be reserved to transmit the routing and signalling control messages throughout the network, between sources and destinations. The fraction of the total link bandwidth specially reserved for the control traffic is, in most broadband network architectures known today, a fixed percentage (e.g. =15%) of the links bandwidth.

As already mentioned, errors in the network operation are very detrimental. Some of these errors are so-called solid errors, others are transient errors.

Means are already known for taking care of solid errors. Transient errors, on the other hand are very tricky because, by definition, the error origin may disappear and yet its consequences may be catastrophic for the whole high speed network operation if not rapidly detected and taken care of. As shall be apparent from the following description of a preferred embodiment of this invention, a transient error may lead to the network full congestion and break-down.

Accordingly whatever be the type of error it could be detrimental to the whole network operation when it is not taken care of rapidly. This is particularly true for so-called transient errors affecting, for instance clock signals. Given the present architecture of available data communication networks, this kind of error may remain undetected, leading to data enqueuing overflow, new errors being generated, congestion occuring and finally possibly freezing the whole data network operation.

The present invention shall focus on monitoring, detecting and processing said transient errors early enough to avoid network congestion.

OBJECTS OF THE INVENTION

It is therefore one object of this invention to provide a method and system for monitoring and controlling transient errors in a digital communication network.

Another object of this invention is to provide a system for monitoring and controlling transient errors in a digital communication network requiring almost no additional hardware in the networks already available in the field.

Another object of this invention is to provide a method and system for tracking transient errors inducing an overflow in a transient queue of a network node adapter and rapidly reorganizing the queue input traffic accordingly.

Still another object of this invention is to provide a method and system for tracking transient errors on the transmit queue output traffic of a network node adapter and rapidly reorganizing the queue input traffic accordingly.

A further object of this invention is to provide a method and system for consolidating said transmit queue traffic control after transient error on queue output traffic and/or queue overflow, on a local node basis and on a network basis.

SUMMARY OF THE INVENTION

The above mentioned objects are achieved by a method for optimizing a digital transmission network operation by tracking transient errors and monitoring high speed packet switching network node, said node including receive and transmit adapters assigned to node traffic, each adapter being connected to a network high speed transmission line or trunk, the transmission bandwidth of which is shared by several connections, each connection establishing a path between a source and a destination, through an assigned buffering queue means controlled by processor means including means assigned line and network managements, said method including:

monitoring each transmit queue data level and output activity with respect to references dynamically defined or preassigned to the considered queue by said line resources management facilities and in case of detecting a predefined error event, then, temporarily barring input to the considered transmit queue; and, reporting said event to line and network managements for final decision on said queue traffic.

These and other objects and characteristics of the invention will become more apparent from the following detailed description of a preferred embodiment of the invention when considered with reference to the accompanying figures.

DESCRIPTION OF THE PREFERRED EMBODIMENT

Figure 1:
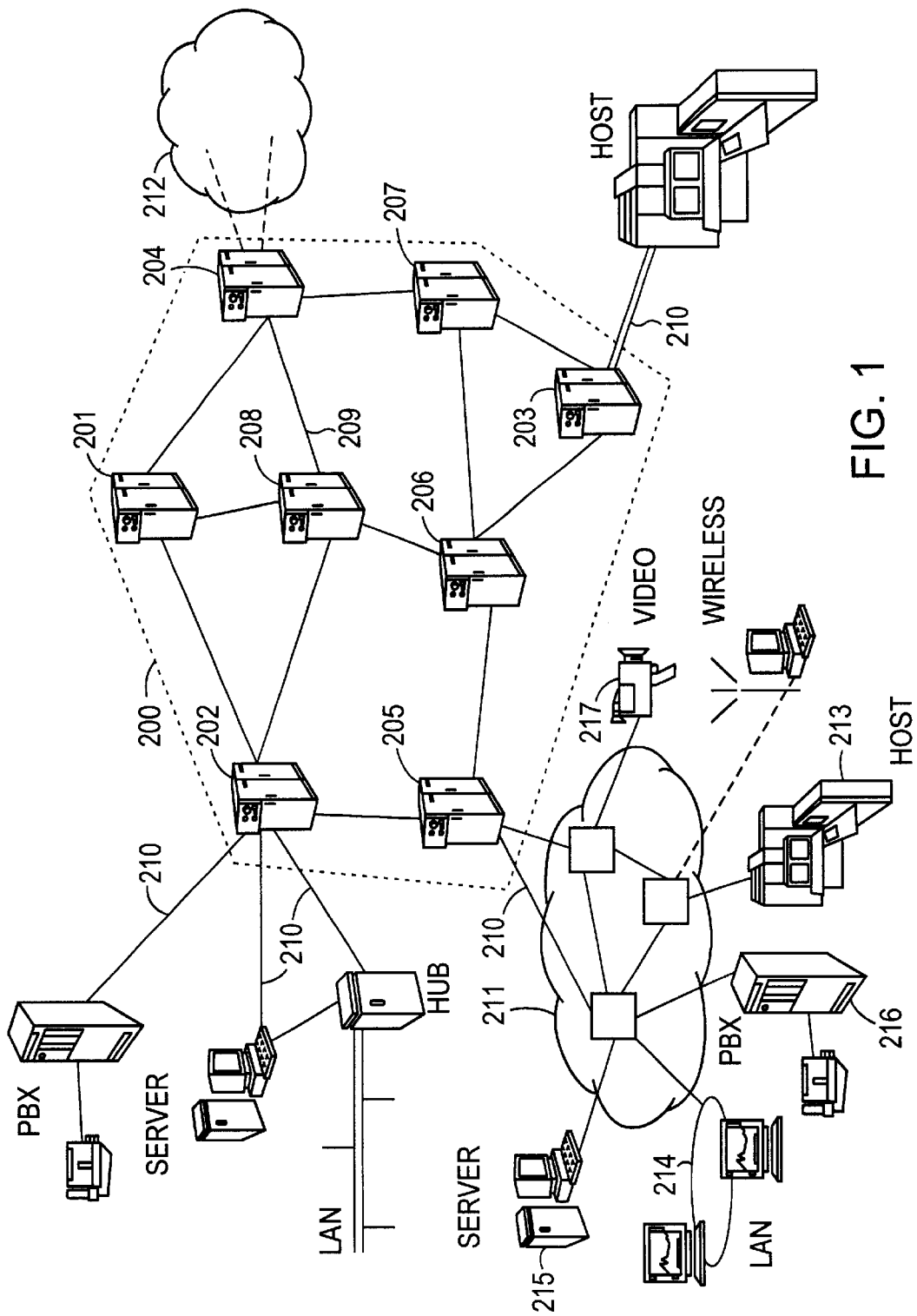
FIG. 1 is a representation of a complex network including the high speed packet switching digital network wherein the invention can be implemented.

As illustrated in FIG. 1 a typical model of communication system is made of several user networks (212) communicating through a high performance network (200) using private lines, carrier provided services or public data networks.

Each user network can be described as a set of communication processors and links (211) interconnecting large computers used as enterprise servers (213), user groups using workstations or personal computers attached on LAN (Local Area Networks 214), applications servers (215), PBX (Private Branch exchange 216) or video servers (217).

These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the flowing packets towards their final destination at the highest possible rate.

The present invention belongs essentially to the latter category and more particularly to the fast packet switching network architecture.

Any trouble in a low speed part (e.g. end user) can have an impact on the high speed trunk between 2 nodes. Because of the trouble, the connection will have to be re-established and the data resent. This leads to the decreasing of the performances of all the end to end applications.

Any elementary trouble as a clock shift, could be corrected by a hardware retry at byte level; This is elementary, but when the corresponding time is transported in the upper logical layers of the system, it becomes congestion. In fact, it is just necessary to wait for the hardware byte retry to secure the full data transfer.

The present application, emphasizes the early detection of an anomaly, the determination that the disruption is not persistent, and the reporting to the upper layers applications.

The general view of FIG. 1 shows a fast packet switching transmission system (200) comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch exchange (PBX), an application server and a hub through three Ports and communicates through the network by means of the adjacent Transit Nodes 201, 206 and 208.

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system or a data sink (destination) for consuming digital data received from another user system, or, typically, both.

Also to be noted is the fact that the entries to the high speed packet switching node constitute variable length packet. Then these packets shall be arranged to be split into fixed length packets or cells (say 256 bytes long for instance) to be transmitted over the packet switching network, and then recombined for the end user.

For additional information on the considered Packet Switching Network Architecture one may refer to the following European Patent Applications of same assignee:

EPO Application No 94480087.9 "A Method and Appararatus for Shaping the Output Traffic on a Fixed Length Cell Switching Network Node"

EPO Application No. 94480096.0

EPO Application No. 94480097.8 "Method for Operating Traffic Congestion Control in a Data Communication Network, and System for Implementing Said Method"

But, for sake of clarity, we shall summarize some of the above cited references characteristics as required for the present invention. To that end, we shall note that fast packet switching operation has been made possible by designing each node of the high speed packet switching network to include a so called Switch interfacing and interconnecting sets of receive (input) adapters and transmit (output) adapters. Each adapter is connected to a high speed transmission line (or trunk), each line bandwidth being shared by a great number of connections said connections establishing path between source and sink users through line virtual channels.

Most of the high speed connections are established on a reserved basis to guarantee the bandwidth and the quality of service requested by the attached user. The path across the network is computed in response to each connection request by the originating node. The computed path is based on the parameters characterizing the network connection requirements and on link capacity and load information maintained in a so-called Topology Database for the network nodes.

The Topology Database contains information about nodes, links, their properties and the bandwidth allocations. This Topology Database is updated as required including, naturally, at each new connection being requested by a user and at each rerouting being required. As shall be seen hereunder, rerouting may be requested in case of possible overload due to transient errors on a given node connection.

The topology information is replicated in each node of the network. An algorithm guarantees the corrections of each node's Topology Database when links and nodes are added or deleted or when their characteristics change.

Input and output nodes adapters are provided with buffering means storing the data into separate queues based on Quality of service requirements and/or provenance/destination.

The adapters operating controls are assigned to programmed processors. But, even using the most efficient general purpose microprocessor available today on the market, the experience shows that it is very difficult to reach the desired level of performances in terms of number of packets switched per second. This is the reason why the control of each adapter has been shared between two processors: a specific purpose processor (labeled RP3 and XP3 for the receive and transmit processors respectively) and a general purpose processor (GPP) in charge of ressources management and network administration, for instance.

Figure 2:
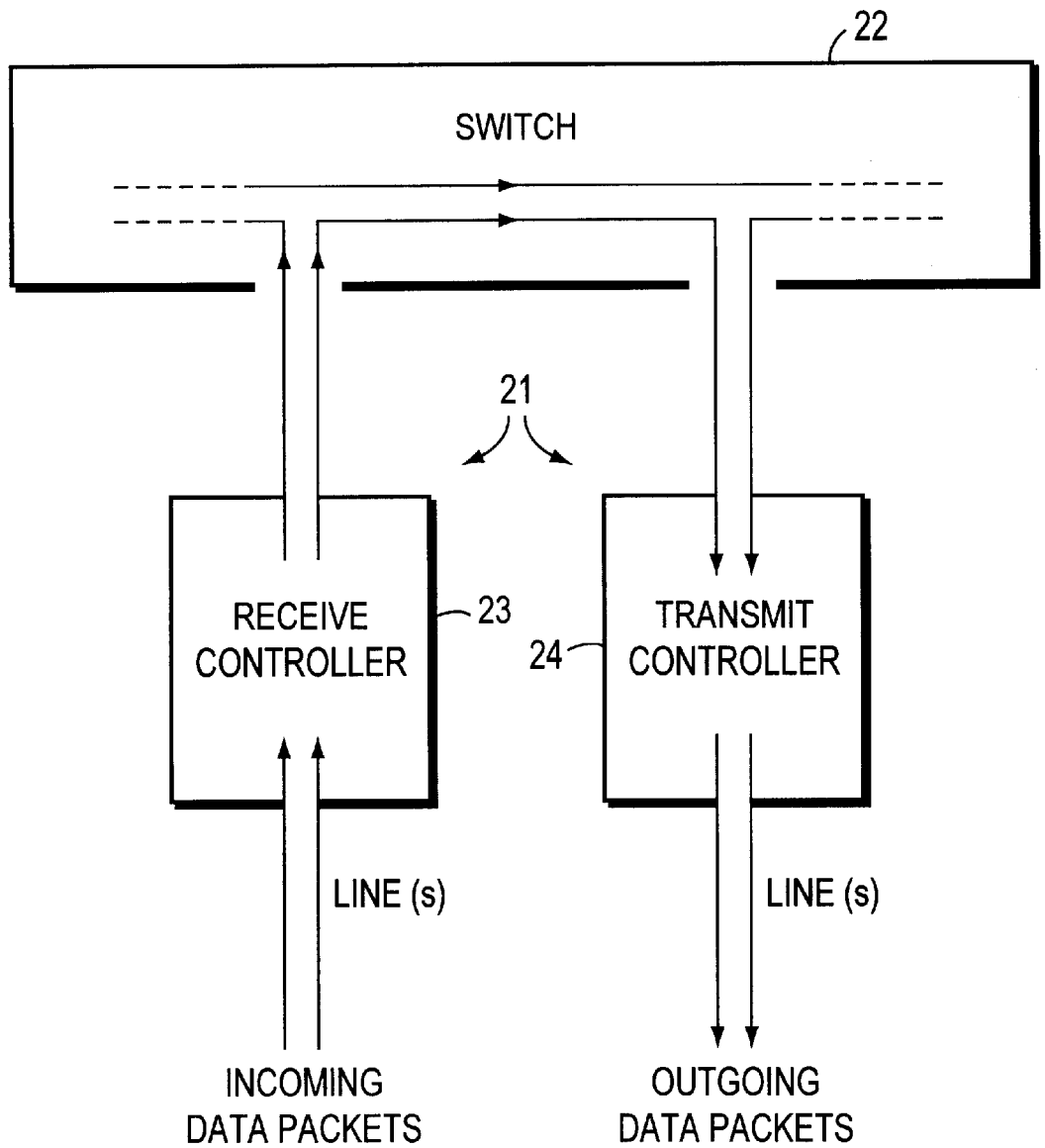
FIG. 2 represents basic elements of a high speed packet switching node.

Accordingly, from a functional standpoint, the node operation may be schematically represented as shown in FIG. 2. Receive and transmit adapters (21) communicate with each other, for data traffic purposes, through the switching means (22). The incoming data traffic from the node attached channels operating at high speed levels (say 1.5 or 2 Mbits/s) may be managed by the specific receive processor (RP3) providing the receive control (RECEIVE CTRL 23). On the node outgoing side, another specific purpose processor (XP3) performs the transmit control (XMIT CTRL) functions (24). A general purpose processor (GPP not represented) performing the network management operations communicates with both receive and transmit controllers. It should however be understood that, as already indicated, the split of functions between specific purpose processors and general purpose processors is only performed to optimize the system performances by compensating for the limited processing power in presently available processors. This split should by no means be considered as a requirement for this invention.

Figure 3:
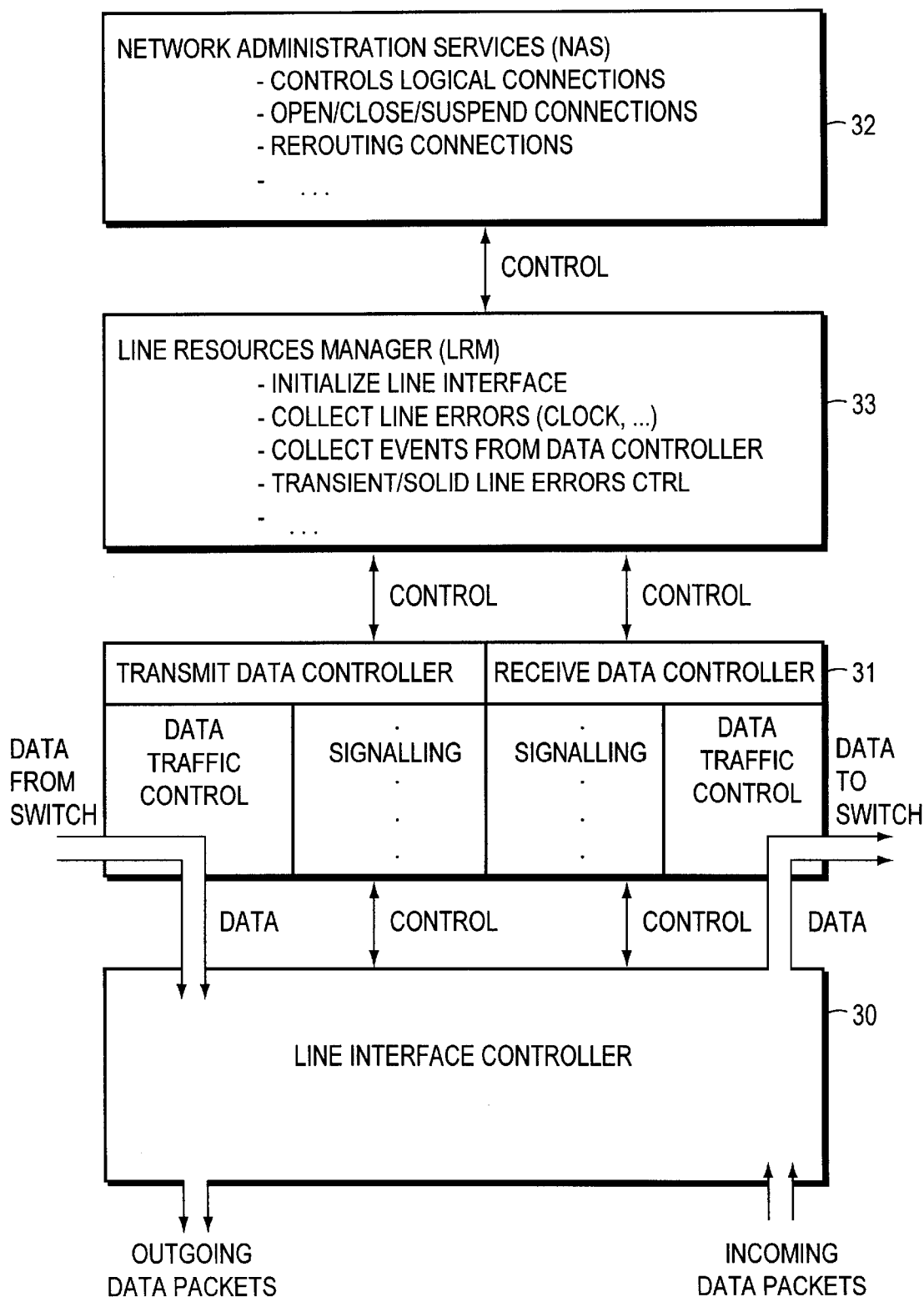
FIG. 3 shows a functional approach of a high speed packet switching node adapter.

The detailed node operation, as represented on FIG. 3, may therefore be summarized, from a functional standpoint as a succession of adapter control layers operations. The first level (31) is directly connected to process the node incoming and outgoing data through a so-called line interface controller (LIC) (30) operation. On the node receiving side the attached lines are scanned by the LIC and said LIC deserializes the received data and checks their validity through conventional Cyclic Redundancy Check (CRC) operations. The collected data bits are forwarded in burst mode, to the receive adapter buffers under the control of the receive controller which assembles the received data into packets (also called frames or cells) prior to forwarding these to the switching device and from there they are sent to the node outgoing link through the transmit adapters.

In addition, so-called control (CTRL) informations are exchanged in both directions with the Line Interface Controller operating in the special purpose processors (RP3; XP3). The control informations transparently transferred via the transmit/receive controllers and up to Network Administrator Services (NAS) (32) via Line Ressources Manager (LRM) (33). Both layer 32 and layer 33 are operated in the general purpose processor (GPP) 25.

The Line Ressources Manager (LRM) functions include managing start and stop transmission over one or several trunks attached to the considered node. LRM functions include also performing the analysis of error signals reported to that level and taking predefined options accordingly. The Network Administrator Services (NAS) layer operates at a higher level by taking decisions affecting the connections proper. Control over said connection includes opening and closing a controlled connection; possibly rerouting traffic as required; and stopping the whole system.

In operation, the control flow includes a one byte long control block per port. Said port control block includes several one bit long flag positions labeled Transmit (XMIT), Active, Discard, Disable and Enable, respectively.

The XMIT Active flag bit is set ON when starting a message transmission and set OFF when ending message transmission.

Figure 6:
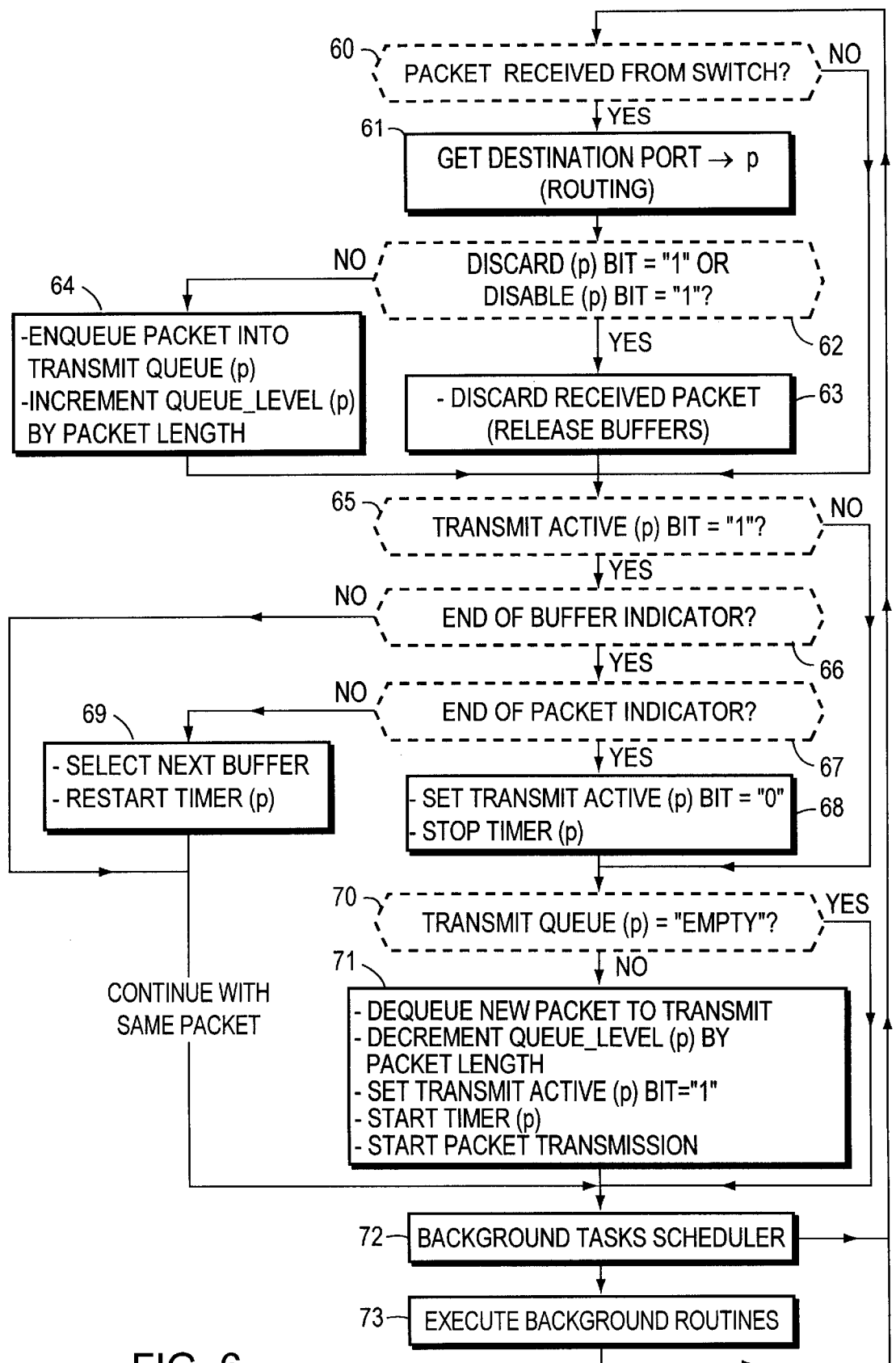
FIGS. 6 through 8 are flow charts for implementing the invention.

The Discard flag bit is set ON when the transmit queue reaches a predefined high level AND when at the same time a lack of free buffers is observed (refer to FIG. 6). When the transmit queue level returns under the threshold, the Discard flag bit is set off.

The Disable flag bit is set ON by either the Transmit Controller (XP3) when a Transmit queue Time_out occurs or by the general purpose processor operating the Line Resource Manager (33) function when an error is detected by the system. As shall be shown later on, the specific error events considered here include an adapter transmit queue overflow or a queue Transmit (XMIT) time out. The time-out parameter is a predefined time threshold value set by the Line Resource Manager according to the considered line operating rate. In the preferred embodiment of this invention, the maximum time-out that should never be reached has been set to two seconds. The time-out is measured by a time-out counter started when a message transmission starts, and stopped at end of transmission of said message. Same counter is reset at Disable/Enable time.

The Disable flag bit shall be set off by the transmit special purpose processor XP3 when the enable flag bit is ON.

The Enable flag bit is set ON by the Line Resource Manager under normal operating conditions for the considered port. It shall be set off by the special purpose processor, as required.

As already mentioned, and as disclosed in details in the cited European applications, each node is assigned multiple adapters and each adapter is assigned multiple users (multiple input/output connections). Since the invention is meant to avoid network breakdown due to transient errors, we shall focus our attention on the node transmit adapter side.

Figure 4:
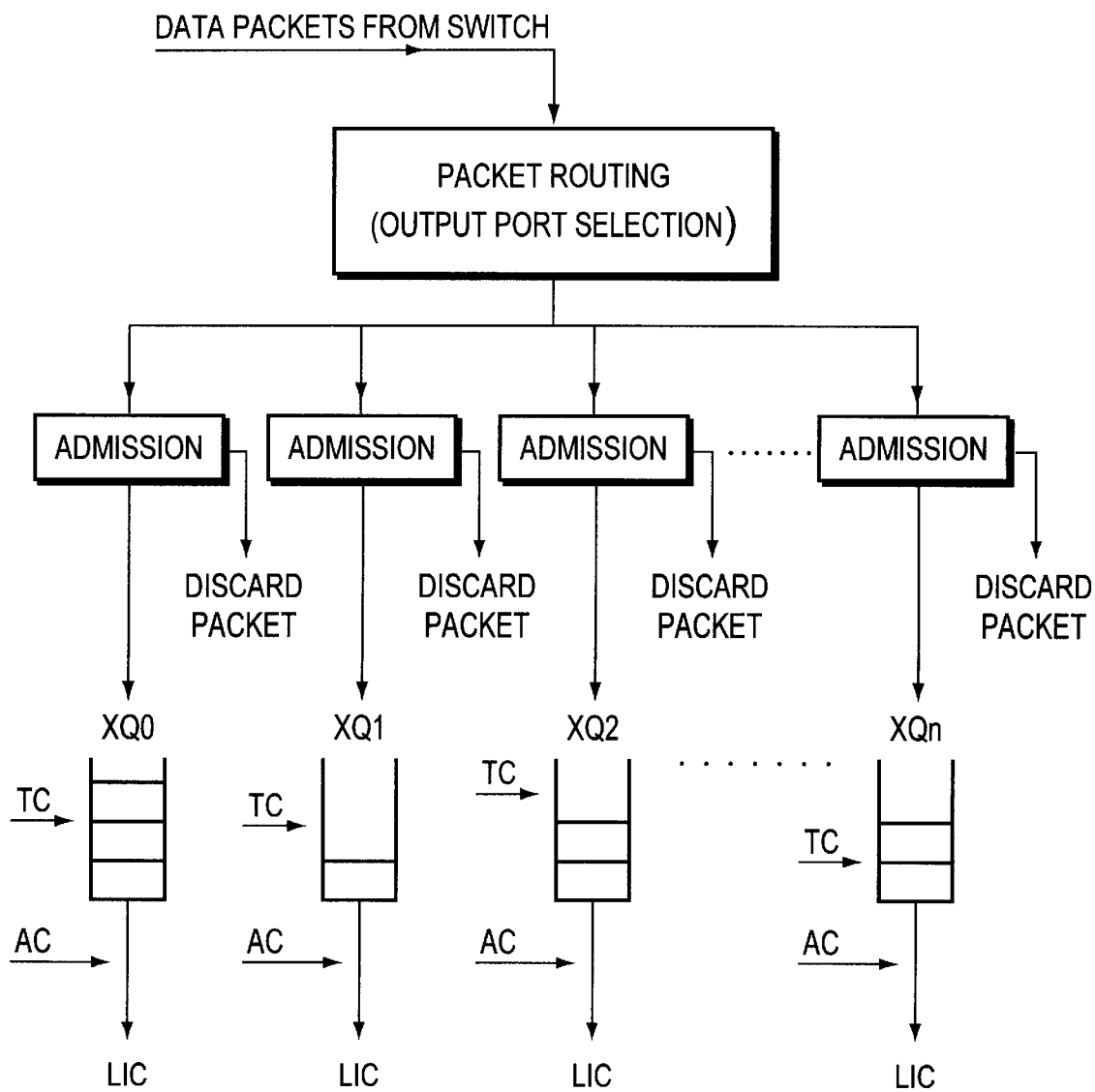
FIG. 4 is a representation of a multiport adapter transmit data flow.

FIG. 4 shows a schematical representation of a multi-user transmit control operation showing the outgoing data buffering into their respective queues. The data provided by the node switch are routed toward their assigned port transmit queue (XQn for the nth port). Said queues are in fact storing pointers instead of data, which pointers should point to a buffer memory in the special purpose processor assigned to transmission operations (XP3). Said buffer memory is organized to store 256 bytes long data blocks or cells, each cell including a logical link pointing to the next cell position belonging to the same considered data message. The last cell ends with an end of message (EOM) indication. Since the transmission is performed on variable length packets, the message is equivalent here to a set of fixed (but for the last block which might be only partially filled) length packets (also named cells or blocks). In addition each 256 bytes long cell is headed by a control bit which is set/reset to indicate that the corresponding cell position is occupied/unoccupied.

With this organization, the storage efficiency is certainly optimized from a cost standpoint. Unfortunately it obviously may lead to the system breakdown in case of an error (e.g. a transient error) occuring in one of the queues and remaining undetected with no data leaving the considered queue while new messages continue to be admitted into said queue.

To avoid falling in such a catastrophic situation, each queue has been provided with a predefined Threshold Control (TC) reference set by the Line Resources Manager; and with a port Activity Control (AC) reference the time-out value of which is also set by the Line Resources Manager. The queue level is constantly monitored with use of a counter. Accordingly, combining the collected monitored informations, the incoming data shall be conditionally admitted or discarded into/from the corresponding queue. Thus, if required, the connection shall be disabled (i.e. Auto-Disable Operations). In this case the Network Administrator layer of the General Purpose Processor (GPP) shall be kept informed to provide a rerouted connection, thus saving the network from breakdown. But also the Line Resources Manager kept informed of an error event shall take a consolidated decision on Disable/Enable.

Figure 5:
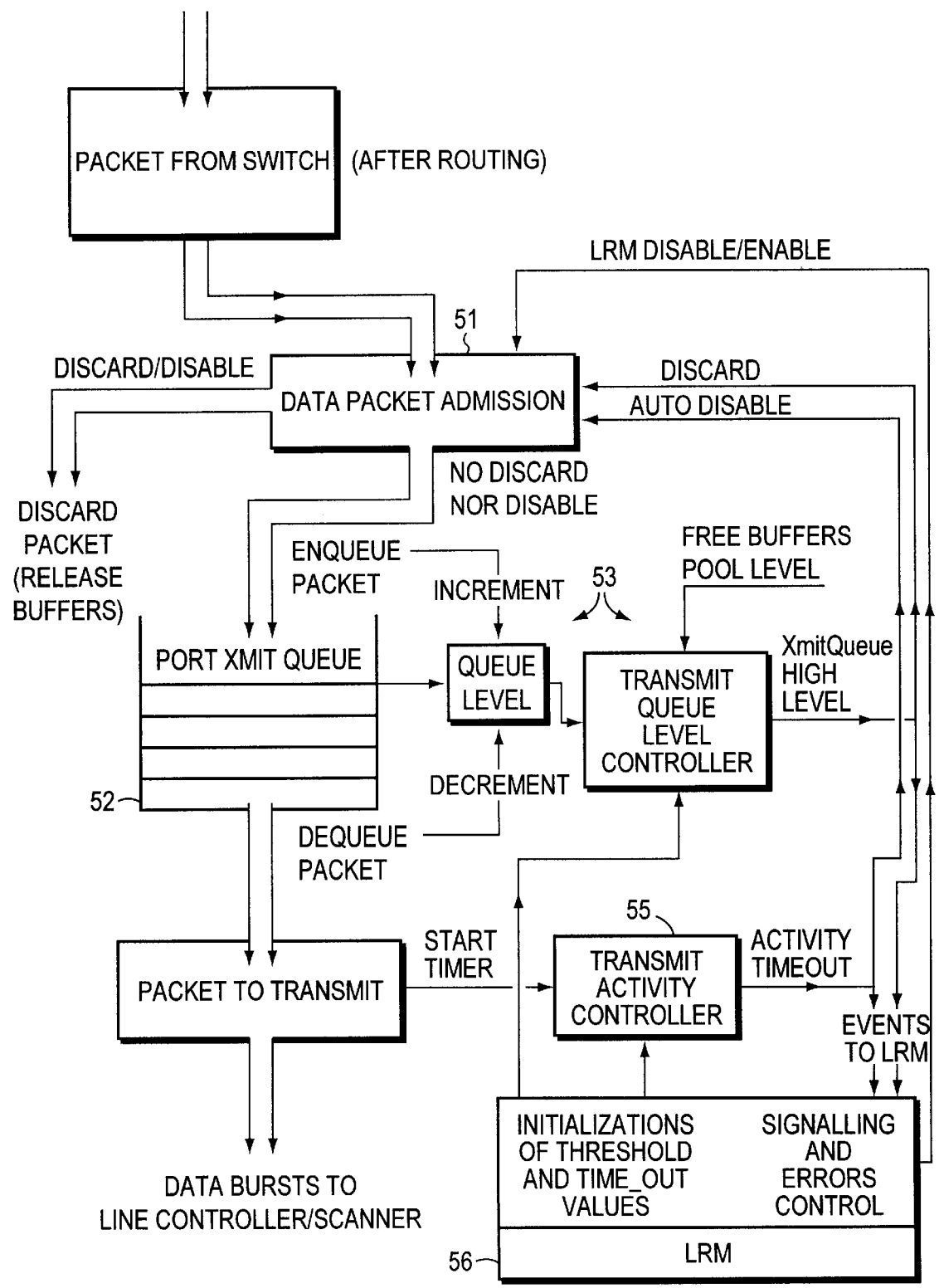
FIG. 5 represents the invention as implemented on one of transmit adapter queues.

Represented in FIG. 5 is a block diagram for the data monitoring and control mechanism on a given port. The data from the switch are gated through a data packet admission mechanism (51). Said gate is controlled by a Disable/Discard flag bits as set in the already mentioned port control block. Should the gate 51 be closed the considered message shall be discarded from the corresponding port transmit queue. Otherwise the data to be transmitted shall be stacked into the corresponding transmit queue or user Xmit Queue (52). A queue threshold control (TC) mechanism (53) is provided which monitors the queue level versus the assigned threshold for the specific queue considered. To that end, the mechanism is provided with a queue counter which keeps track of the queue level by being imcremented when a data packet is enqueued and decremented when a data packet leaves the queue for transmission over the output link. Said queue threshold control mechanism is initialized by the Line Resources Manager. Also, the available buffer memory resources of the transmit special purpose processor XP3 are permanently analyzed. The global buffering resource availability (Free Buffers pool) is tracked through the number of control flag bits heading each 256 bytes long memory position and which are reset. When the queue threshold is reached as indicated by the queue counter, and the XP3 memory resources are in depletion, the special purpose processor implementing transmit queue level control indicates that the considered queue level is high and sets the Discard bit (p), p=1, 2, 3, . . . , n, being the considered queue position reference., This Discard bit is then used to close the gate of the Data Packet Admission, mechanism(51) and therefore discard the queue incoming packet(s) from the corresponding queue. In parallel, the queue high level bit is set ON and forwarded to signal the event to the Line Resources Manager. The situation is maintained till the transmit queue and free buffer pool levels return to non critical values.

Combining both threshold consideration and buffer memory availability indications provides an additional flexibility to the system. By doing so, should the transient error effect be rapidly recovered from, then the system is not disturbed unnecessarily as long as a predefined portion of XP3 buffer memory could be made available to the considered queue (p). But the LRM shall also be consulted by Network Management (e.g. NAS) to identify the disturbing connection.

As represented in FIG. 5, the port data monitoring and control mechanism includes also a Port Activity Control (55). The system is provided with an Activity Control (AC) timer. This timer is initialized by the Line Resources Manager. Then, at the end of each 256 bytes long block exiting the considered queue buffer, an End Of Buffer (EOB) flag bit triggers the Port Transmit Activity control for restarting the timers. At the end of the transmission of a given message (i.e; several blocks) the timer is stopped by an End of Message (EOM) flag.

Now should an error occur during the transmission of a 256 bytes long block, the AC timer shall then not be reinitialized as required, and a Time Out (T.O.) flag shall be subsequently set based on the preassigned time out threshold. Consequently, when the Xmit Active flag bit of Port Control Block is ON and the preassigned Time-Out level is reached, the XP3 operating the Port Activity Control operations sets an auto-disable signal which closes the data packet admission table and disables the considered port. This time-out indication is reported to Line Resources Management (33,56) and from there forwarded to Network Management (32) (i.e. NAS) for possibly network reconfiguration and connection re-routing. The device 56 provides LRM Disable/Enable signal controlling the Data Packet Admission gate mechanism (51).

The decisions taken by both queue level control (53) and port activity control (55) mechanisms are therefore reported in parallel to both the Data Packet Admission (51) mechanism and to the Line Resources Manager (see EVENTS forwarded to LRM). Direct reporting to the admission mechanism should have a temporary effect enabling avoiding unnecessary traffic jam, it should however be then confirmed by the Line Resource Manager (possibly reporting to the Network Administrator) for taking the final decisions. Said final decisions include LRM Disable/Enable orders to the Packet Admission gate mechanism (51), control and resetting of queue threshold and timer time-out values).

The Network Administration Services being reported to shall, if required, reroute the considered connection data through the network. In other words, the combination of error monitoring based on informations collected by queue level control (53) and port activity control (55) are processed and consolidated by the Line Resources Manager and Network Administration Services to enable improving the network traffic control.

The full detailed method of the operations of queue level control (53) and port activity control (55) shall now be described in details with reference to the flowcharts of FIGS. 6 and 7. But to help reinserting the invention process in its background, one may refer to the already cited European Applications. In summary, the general process operated in XP3, includes high priority level and low priority level tasks. The high priority steady state tasks include: packet routing, assembling/disassembling, formatting, etc., belonging to a so-called steady state loop. The low priority level tasks are carried out by XP3. Unless these tasks are by-passed by the system scheduler for higher priority tasks including steady state tasks performed by the processor at each process run. The process of this invention shall be implemented as an additional low level task. Both steady state tasks and low level tasks can be interrupted on request. The interrupt routines are used to handle buffering processes consisting in storing data packets into buffers, queueing the packet pointers, dequeueing the packet pointers, releasing the buffers, processing the end of message flags (EOM) or the end of buffer (EOB) flag.

In operation the high level steady state loop with corresponding interrupts represent about 95% of the XP3 processor load, while 5% are devoted to the low priority tasks.

As far as the invention is concerned, the flowchart in FIG. 6 represents the process involved in XP3 for performing the steady state loop operations. First step (60) involves checking whether a data packet is being received from the switch and checking destination port p (with p=1, 2, . . . , n) (61). Should the answer to the test (60) be positive, then the corresponding port control block flag bit positions for discard (p) or disable(p) are checked (62) to detect whether the incoming data should be discarded. In case of positive answer to this test (62) the packet is discarded (63). In case of negative answer to test (62), the data are enqueued in the corresponding transmit port queue XQ(p) and the queue level counter is incremented by the corresponding packet length (64). After discarding operation (63), or in case of negative answer to test (60), the process branches to test (65), as it does after performing the operations of (64).

A test is then performed to check whether the port p control block bit position assigned to indicate transmit (Xmit) Active is set (65). Should the answer be positive then a subsequent test (66) is performed to check whether the End of Buffer (EOB) is reached. In case of positive answer, the End of Message (i.e. packet) EOM indicator is checked (67). If the EOM indication is reached, then the process proceeds to step (68) otherwise next buffer of the considered packet is selected and the timer is restarted (69). After operating (68) or should the answer to test (65) be negative, the system checks whether the considered Transmit Queue (i.e. XQ(p)) is empty (70). If not, then the system branches to performing the following operations (71):

Dequeue a packet to transmit,
Decrement the queue level counter by packet length,
Set the transmit Active bit to "1" in the port (p) control block,
Start the Timer (p); and
Start a packet transmission.

Then the system branches to performing the so-called Background Tasks (72,73), as it does also after performing the operations in (69) or should the answer to test (66) be negative. Once the Background Tasks are performed, the system branches back to the Steady State Transmit loop of FIG. 6.

Figure 7:
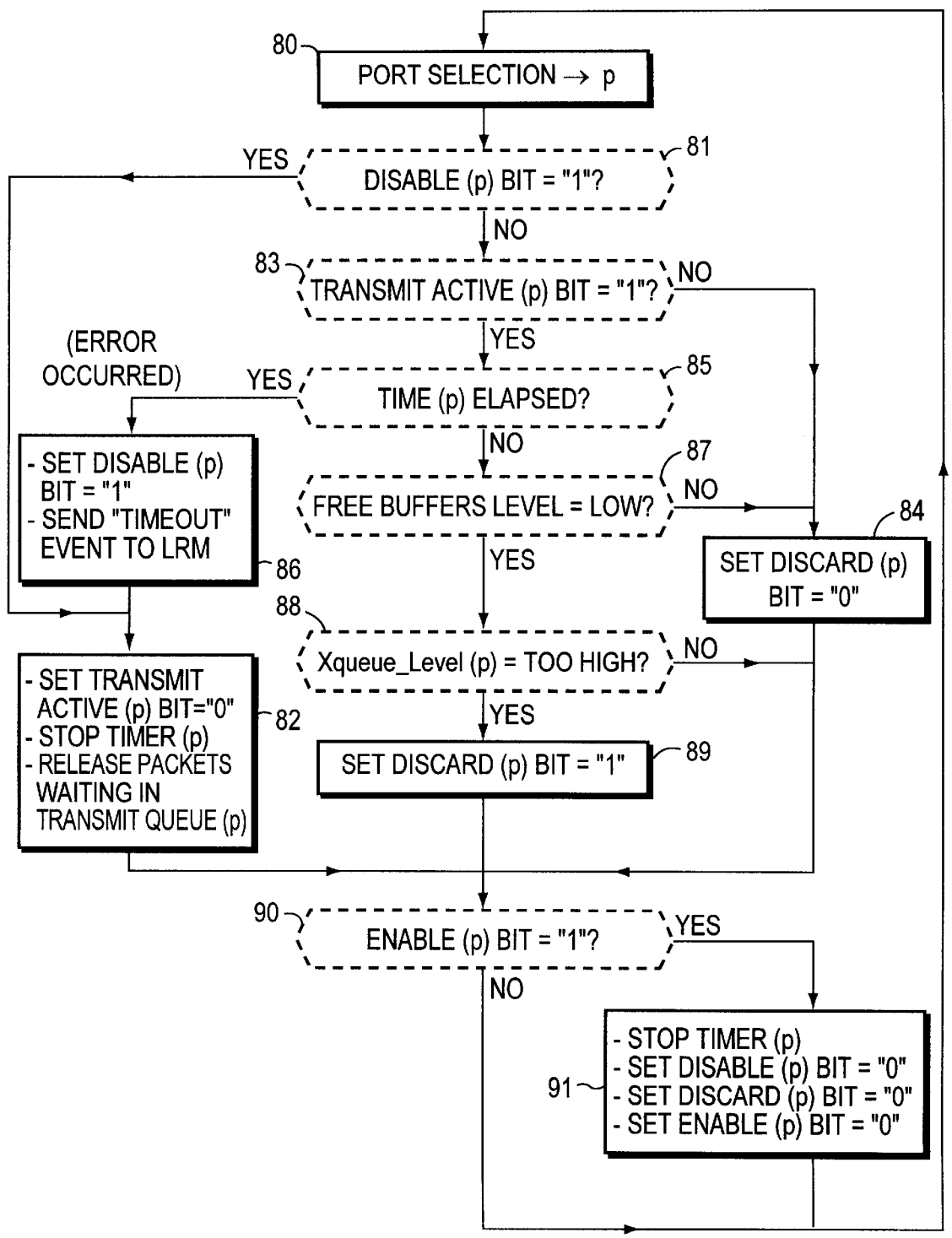

The detailed operation of the background tasks involved in controlling transmission on a given port in accordance with the invention is represented in the flowchart of FIG. 7. Once a port "p" is selected (80) the corresponding Disable flag bit in the port control block is checked (81). If this bit is set to "1", the process branches to operations (82) for discarding the packets waiting for transmission in the considered queue (i.e. releasing the assigned buffers) while resetting the Transmit Active flag bit to zero and stopping the corresponding timer.

If the answer to test (81) is negative, i.e. Disable (p) bit=0, the process proceeds to a new test (83) on the value of the Transmit Active flag bit. If this bit is raised to "0"the corresponding Discard flag bit is set to zero (84). Otherwise, the timer is checked. If the corresponding time elapsed (85), an error has occurred and therefore the Disable flag bit should be set to "1" and a Timeout event signalled to the Local Resource Manager (86). The system proceeds then to step (82). If no error occured as indicated by a negative answer to test (85), the free global buffering capacity is checked (87). In operation the level of free buffers is tracked through the queue of free buffer pointers stored into a table (i.e. Free Buffer queue storing the free buffer pointers). The difference between the corresponding tail control pointer and head control pointer in the free buffer queue indicates the Free Buffer Level looked for.

Should the answer to test (87) be negative, meaning that free buffer locations are available, the process branches to step (84). Otherwise another test is performed (88) on the XQ(p) level. If the XQ(p) level is too high, then Discard flag bit is set to "1" (89).

Once the operations (82,84 and 89) are performed, or should the answer to test (88) be negative, the process branches to test (90) for checking the value of the Enable bit in the corresponding control block. If this test is positive, the following operations are performed (91):

the timer (p) is stopped; and
the Disable, Discard, Enable flag bits of the control block are all reset to zero.

After performing these last operations, (i.e.(91)), or should the answer to test (90) be negative, the process loops back to (80) for selecting next port (p) and proceeding through the following operations again, and this until p=n. After p=n loop, the process restarts with p=0.

Figure 8:
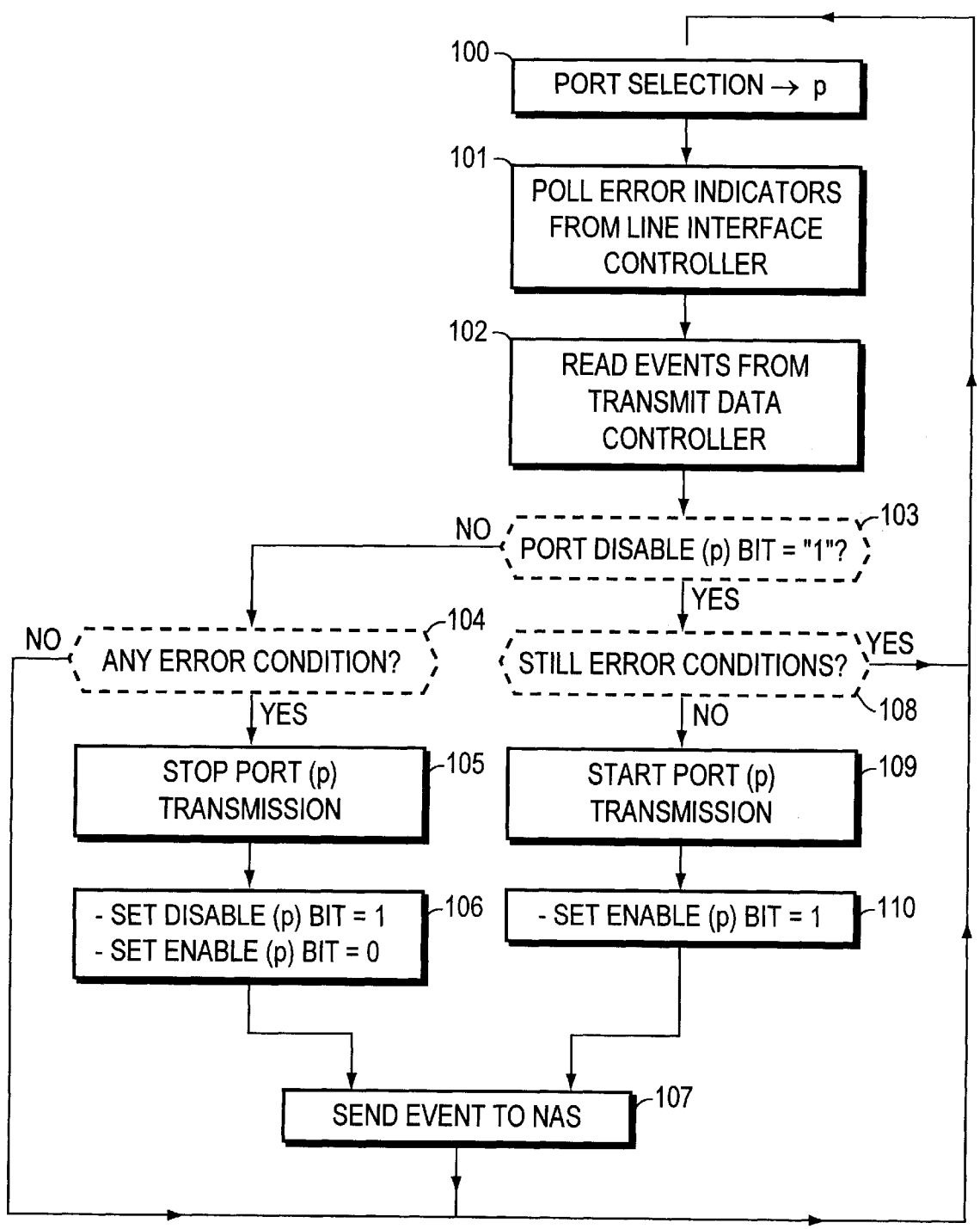

Represented in FIG. 8 is the flowchart of the Line Resources Management operations performed when implementing the invention. The transmit ports are scanned and for each selected port p (100), the error indicators are polled from the Line Interface Controller (101). Then, the above mentioned events (see FIG. 5) forwarded to the Transmit Controller are read-out (102).

The port control block flag bit Disable is checked (103).

Should this bit be equal to zero, then the system checks for any error condition (104). If none are reported, the process loops back after incrementing p to process next XMIT Queue. Otherwise, the port p transmission is stopped (105). The Disable flag bit is set to "1" in the port control block, while Enable bit is set to zero (106). Then the event is reported to the Network Management (107) for considering rerouting of the considered connection (i.e. network reconfiguration) and the LRM scanning proceeds to next port (100) and the process resumes.

But should the answer to test (103) be positive, then the LRM checks whether there are still error conditions (108). If yes, the process loops back to (100), otherwise, LRM makes the LIC p ready for transmitting (109). Then the Enable flag bit is set to one in the port control block. The process reports then the event to Network Management (107) for possible network reconfiguration, and loops back to (100).

What is claimed is:

1. For use in a high speed packet switching network node having a plurality of transmit adapters and a plurality of transmit queues created by assigning memory locations from a buffer pool, each transmit queue being assigned to one of the transmit adapters, a plurality of systems for controlling the admission of packets to the transmit queues, each system being associated with one of the transmit queues and comprising:

a queue threshold detector which generates a threshold-exceeded signal when the queue occupancy exceeds a predetermined threshold level;

a free buffer space detector for generating a low-buffer signal when the number of free memory locations in the buffer pool falls below a predetermined threshold;

a discard signal generator responsive to concurrent threshold-exceeded and low-buffer signals to generate a packet discard signal;

a port activity timer which generates a transmission time-out packet discard signal if the transmit queue requires more than a predetermined time to dequeue its contents following the start of a dequeuing operation; and gate control logic responsive to packet discard signals from either said discard signal generator or said port activity time to block the enqueuing of a received packet into the transmit queue.

2. A system as described in claim 1 wherein the node further includes a line resources manager for controlling threshold levels and time-out values, said system further including event reporting logic for generating a report of threshold-exceeded signal events, low-buffer signal events and transmission time-outs for use by said line resources manager.

3. A system as described in claim 1 or 2 wherein said port activity timer further includes:

start logic for initiating timer operation at the start of a dequeuing operation;

reset logic responsive the occurrence of an end-of-buffer flag in a dequeued packet to reset the time;

a threshold detector for generating a time-threshold exceeded signal if the timer operation continues beyond a predetermined threshold interval; and a signal generator for generating the transmission time-out packet discard signals in response to the time-threshold exceeded signal.

4. For use in a high speed packet switching network node having a plurality of transmit adapters and a plurality of transmit queues created by assigning memory locations from a buffer pool, each transmit queue being assigned to one of the transmit adapters, a method of controlling the admission of packets to a transmit queue comprising the steps of:

generating a first signal if the queue occupancy exceeds a predetermined threshold level;

generating a second signal if the number of free memory locations in the buffer pool falls below a predetermined threshold;

generating a third signal if the first signal and second signal occur concurrently;

generating a fourth signal if the transmit queue remains in a dequeuing state for greater than a predetermined period of time; and denying admission of a new packet into the transmit queue in response to either the third signal or the fourth signal.

5. A method as set forth in claim 4 further including the step of reporting the occurrence of the first, second and fourth signals to a line resources manager to enable the manager to determine whether either of the threshold levels or the predetermined period of time should be altered.

6. A method as set forth in either claim 4 or 5 wherein the step of generating the fourth signal further comprises the steps of:

starting a count-up timer at the beginning of a packet dequeuing operation;

resetting the count-up timer in response to the detection of an end-of-buffer flag in the data being dequeued in the packet dequeuing operation; and generating the fourth signal if the count exceeds a predetermined threshold count.

* * * * *